United States Patent
Peyton (10) Patent No.: US 6,709,199 B2
(45) Date of Patent: Mar. 23, 2004

(54) SEDIMENT CONTROL SYSTEM FOR FLUID CONTAINMENT BASINS

(76) Inventor: Dennis E. Peyton, 11423 E. McKinley Ave., Sanger, CA (US) 93657

( * ) Notice: Subject to any disclaimer, the term of this patent is extended or adjusted under 35 U.S.C. 154(b) by 0 days.

(21) Appl. No.: 10/083,272

(22) Filed: Feb. 23, 2002

(65) Prior Publication Data

US 2003/0161686 A1 Aug. 28, 2003

(51) Int. Cl.$^7$ .............................. B65G 5/00; E02B 8/02
(52) U.S. Cl. ............................ 405/53; 4/491; 210/170; 210/747; 405/74; 405/79
(58) Field of Search .............................. 405/25, 53, 73, 405/74, 79; 210/170, 747; 4/491

(56) References Cited

U.S. PATENT DOCUMENTS

| | | | | |
|---|---|---|---|---|
| 1,811,565 A | * | 6/1931 | Schwabacher | 4/491 |
| 4,209,388 A | * | 6/1980 | DeFraites | 210/170 |
| 4,876,004 A | * | 10/1989 | Verhoeff | 210/170 |
| 5,094,566 A | * | 3/1992 | Parks | 405/74 |
| 5,123,780 A | * | 6/1992 | Martinsen | 405/25 |
| 5,405,217 A | * | 4/1995 | Dias et al. | 405/25 |
| 5,595,458 A | * | 1/1997 | Grabhorn | 210/170 |
| 5,951,866 A | * | 9/1999 | Grove et al. | 210/170 |
| 6,109,835 A | * | 8/2000 | Grabhorn | 210/170 |

OTHER PUBLICATIONS

Unknown, "Chino Basin Water Conservation District" report for the 1998/99 fiscal year, 10 pages, United States.
Unknown, "Annual Report for the Chino Basin Water Conservation District for the 1999/00 Fiscal Year," 10 pages, United States.
Unknown, "Annual Report for the Chino Basin Water Conservation District for the 2000/01 Fiscal Year," 10 pages, United States.
Unknown, "Annual Report for the Chino Basin Water Conservation District for the 2001–2002 Fiscal Year," 15 pages, United States.
Unknown, "Contributions to Environmental Management for Egypt's Groundwater Resources—Final Report EMGR Project 1994–1999," Oct. 1999, RIGW/IW ACO B.V., Egypt/Netherlands.

* cited by examiner

Primary Examiner—Thomas B. Will
Assistant Examiner—Tara L. Mayo
(74) Attorney, Agent, or Firm—Richard A. Ryan (57) ABSTRACT

A fluid containment basin having ridges located in the bottom of the basin and furrows adjacent to the ridges to facilitate maintenance of the basin using the naturally occurring forces of gravity, wave action and fluid currents. The ridges can be formed from material taken from the furrows into shapes that facilitate wave action against the sides of the ridges. While the fluid level is above the ridges, sediment settles on the ridges and furrows, reducing the permeability of the ridges and furrows and, therefore, the drainage from the basin. Wave action against the sides of the ridges as the fluid level is lowered washes the sediments off the ridges into the furrows, thereby restoring the permeability of the ridges. The wave action can be wind generated or induced by a wave mechanism. The furrows can be allowed to become impermeable or be lined to prevent contaminates from migrating.

25 Claims, 6 Drawing Sheets

SEDIMENT CONTROL SYSTEM FOR FLUID CONTAINMENT BASINS

BACKGROUND OF THE INVENTION

A. Field of the Invention

The field of the present invention relates generally to systems for controlling sediment in earthen basins, such as groundwater recharge and flood control basins. More specifically, the present invention relates to such systems that utilize multiple sloped surfaces through which fluid can continually percolate so as to prevent sediments that would otherwise impede the flow of the fluid through the earthen basin.

B. Background Art

Earthen basins are commonly used to contain water for several purposes including, but not limited to, groundwater recharge of surface water, flood control and containment of municipal, industrial and agricultural waste waters. The function of these basins often rely on, or are enhanced by, the percolation of the contained water through the bottom and sides of the basin. The percolation rate of the basin is primarily controlled by the underlying soil conditions and material and by the amount and type of sediment which has settled on the surface of the basin bottom. The sediment usually becomes the controlling element, often clogging a basin so that pumping the water or fluid from the basin becomes the only economical means of draining the basin for maintenance. The subsequent removal or mixing of this clogging sediment requires light and/or heavy equipment after the basin has adequately dried. The equipment used for basin maintenance can compact the surface material, thereby requiring additional efforts to uncompact the material and return the basin to its maximum infiltration performance levels. The challenge for basin designers and operators has been to develop a low maintenance facility without compromising percolation effectiveness.

It is well known that percolation is at or near the maximum rate for the first several months of operation after initial basin construction or after maintenance of an existing basin because the surface of the basin has not had time to become clogged by sediment materials. The surface clogging sediment results from several sources of fines, including single cell and filamentous algae, silts and clays in the irrigation/recharge water and generated by interbasin erosion (filling and levy erosion. Over time the percolation ability of the basin decreases as the sediment forms a virtually non-impregnable clogging layer. The infiltration clogging effect of the sediment is a serious concern for all industries, businesses and agencies using percolation basins. Accumulated sediments limit the percolation of water through a basin and, without routine mechanical maintenance, the clogging effect will eventually render a basin's percolation ability virtually useless. As explained in more detail below, basin owners and operators have historically used discing, ripping, scraping and combinations thereof to control and/or remove the clogging sediment layer with varying degrees of success. If the sediment was composed of inorganic material, discing or shallow mixing is often ineffective because the near surface becomes clogged with the accumulated fine grained material. If the sediment included sufficient organic material, discing or shallow mixing without routine deep drying cycles is ineffective because the near surface becomes clogged with anaerobic microbes. Scraping and subsequent ripping can be effective, but it is costly and is typically required at least every three years.

Sediments are inorganic and/or organic particles which settle on the surface of the basin during the filling and operation of the basin. The sediments are generated and accumulated via several mechanisms including: (1) release of silt and clay from the native basin material into suspension by turbulence from the filling water in a freshly maintained or newly constructed basin; (2) wave action on the basin's perimeter side slopes; (3) settling of the suspended silt and clay contained in the influent water; and (4) settling of suspended organic materials (i.e., algae and weeds) that grow in the basin. Clays and silt-clays (fines) are deposited as a thin layer on the bottom of the basins. A layer of these fines as thin as one-eighth inch has about as much resistance to infiltration as two feet of silty sands, forty feet of sugar sands and two thousand feet of clean gravel. Over time, organics may also settle to the bottom of the basin. These settled organics also affect the infiltration ability of the basin.

The common methods of maintaining the basin and controlling the clogging effect are expensive and time consuming. All these methods first require that the basin be drained and dried. After drying, heavy equipment is normally used to access and work in the basin's bottom. The draining process sometimes requires pumping the water from the basin when the basin's bottom is significantly clogged. Pumping is also used when the basin's bottom is only somewhat clogged, but time is of the essence. Set forth below is a summary of the various maintenance methods that are used (after first draining the basin).

The "Dry and Crack" Method (also referred to as the "Chip" Method) is often used where the climate is normally hot and dry and the water availability is intermittent or sporadic. It is also used where land for basin construction is abundant and basins can be easily cycled in and out of operation. The surface sediment on the bottom of the basin is allowed to dry and crack to form what are commonly known as "chips," due to their appearance similarity to potato chips. Once the chips are formed, the basin is generally brought into operation without any mechanical cleaning. Although the permeability of the basin is initially substantially improved, the chips soon resettle and the small spaces between the chips are soon filled with sediment and the basin becomes clogged, requiring the basin to be re-dried. This process is repeated frequently, sometimes as often as twice a month. Periodically, the chips have to be removed by mechanical scraping or raking. The material just under the surface normally becomes compacted, further restricting percolation. Under this method, the operational time of the basin is limited to relatively short periods between refilling of the basin and stopping the influent flow to allow drying. As is well known, the effectiveness of the Chip Method is limited by climate, water availability and available land for multiple basins.

The "Shallow Mix" Method is the desired method when the climate facilitates faster basin drying and time is of the essence for basin maintenance. It is also used when and/or where removal of the sediment is difficult or where the concentration of sediment in the influent water is relatively high, thereby making the Chip Method less viable. The basin bottom is dried longer and deeper than in the Chip Method, forming chips and a moisture content that will allow mechanical equipment, such as a tractor, to drive on the bottom and use a tool, such as a disc, spring tooth, plow or other shallow mixing device, to break-up and mix the chips with the upper surface material. The chips and/or sediments are mixed with the upper surface material to disperse the thin layer of clogging sediment into the upper surface material.

The mixing usually takes place within the upper six inches or fifteen centimeters of the basin bottom. This method is more effective than the Chip Method at dispersing the layer of sediment and temporarily improving the permeability of the basin. This process is repeated as needed, typically once a year. Depending on the soil composition and the amount of compaction from the tractor, occasional ripping may be needed to maintain acceptable percolation rates. With repeated mixing of inorganic sediment, the mixed layer becomes increasingly impermeable and must eventually be removed. If the repeated mixing includes the presence of organic sediments, the mixed layer will likely support an active anaerobic condition when the basin is in operation. Anaerobic microbes develop and thrive in oxygen poor environments and in the presence of organic nutrients. Over time, the slime-bodied anaerobic microbes become the clogging layer and limit the percolation rate.

The maintenance of an inorganic or anaerobic clogged basin requires the basin be dried to a level where heavy equipment, such as a paddle wheel scraper, is used to remove a minimum of six inches or fifteen centimeters of material. Unfortunately, the use of heavy wheeled equipment, including the paddle wheel scraper, compacts the upper portion of the basin's bottom. This compaction is so detrimental to percolation that it is often necessary and/or cost effective to then utilize another piece of heavy equipment, for instance a tracklayer (bulldozer) with ripping shanks to decompact or loosen the compacted upper layer. A slip plow is often used in conjunction with the ripping shanks to provide the most effective ripping operation. Although generally beneficial, the ripping operation can bring stones or unwanted pieces of cemented material to the surface. Ripping also leaves the ground surface so uneven that yet another piece of equipment, such as a tractor and disc or springtooth, is sometimes used to provide a more even basin bottom surface. The basin is then filled for normal operation. Although this method provides better conditions for long term percolation than does the Chip Method, the cost of routine mixing, eventual material removal and compaction ripping is significant. As a result, the Shallow Mix Method is limited by the availability and cost of operating heavy equipment. The effectiveness of this method is also limited by climate, water availability and loss of basin operation benefits due to the time needed for adequate drying and equipment operation.

A third method, the "Deep Mixing" Method, is the desired method when the influent water's sediment concentration is quite high and removal of the sediment is difficult. This method is also used when the sediment is difficult to dry and/or remove or when it can be mixed in the underlying material with available heavy equipment. In this method, the basin bottom is dried to a moisture content that allows heavy equipment, such as a tracklayer, to drive on the bottom and use a ripping shank, perhaps combined with a slip plow, or other deep mixing device. The surface chips and/or thin sediment layers are mixed with the underlying material to disperse the clogging sediment into the underlying material. This mixing usually takes place within the upper six feet or two meters. This method is also effective at dispersing the layer of sediment and temporarily improving the permeability of the basin. The mixing process is repeated as needed, normally once a year or less often as conditions require.

With repeated mixing and the presence of organic sediment, as commonly found in municipal waste water treatment effluent ponding basins, the deeply mixed layer will likely begin to support an active anaerobic condition. This anaerobic condition will likely occur and continue even when the basin is drained and not in operation since most of the mixed organics are at depths that rarely dry. Over time, the slime-bodied anaerobic microbes themselves will become the clogging layer and limit the percolation rate. The eventual maintenance of an anaerobic clogged basin requires the basin be dried to a level where very heavy equipment, such as a paddle wheel scraper, can be used to remove all the organically clogged material. This scraping operation requires large amounts of earthen material to be stockpiled or removed from the basin area.

As with the Shallow Mixing Method, the use of heavy wheeled scraping equipment, such as a paddle wheel scraper, normally compacts the upper portion of the scraped basin bottom. As with any scraping operation the resultant compaction is detrimental to the percolation and should be dealt with as described above. The basin is then ready for filling and normal operation. This method provides better conditions for long term percolation than does the Chip or Shallow Mixing Methods. The cost of routine mixing and the eventual removal of large quantities of material and compaction ripping, however, makes the Deep Mixing Method a very expensive means of maintaining a water containment basin and creates long term constraints. This method is significantly limited by the availability and cost of operating heavy equipment and disposal of the unwanted material. The effectiveness of this method is also limited by climate, water availability and loss of basin operation benefits due to the time needed for adequate drying and equipment operation.

Growing concerns regarding contaminants (i.e., regulated chemicals and substances) leaching into the groundwater from percolation basins has resulted in new regulations regarding the control of erosion at construction sites where surface drainage waters flow into the basins. As is well known, eroded sediments will often adsorb or bond to common contaminants and then carry those contaminants into the containment basin. In general, the prior art Chip, Shallow Mixing and Deep Mixing methods of basin maintenance are poor methods of contaminant control because the contaminants remain in the bottom of the basin where percolation is taking place. In fact, these three methods are somewhat in conflict with contaminant control goals because the contaminants can be easily leached, with the percolating water into the unsaturated or vadose zone, then possibly into the groundwater. When contaminant control is also required of a basin, basin maintenance becomes increasingly important and more expensive. The frequently required basin draining, drying, removal of sediments and contaminants followed by the efforts to decompact the soil require significant downtime, staff and equipment. In addition, there are concerns with air dispersal of sediments and contaminants during the basin maintenance process by the creation of dust and dust particles. The conflict of percolation effectiveness versus contaminant management usually results in basins having less effective percolation characteristics and utilizing basin maintenance methods that maintain those characteristics. Concerns regarding sediment as a basin contaminant have recently required building contractors to employ expensive on-the-jobsite sediment and other contaminant containment practices and equipment.

One such method that is used for management of contaminants is the "Minimum Scraping" Method. This method is employed when the object of the maintenance is to remove the sediment with the minimum amount of excess (i.e., disposal) material, such as when the sediment is considered to contain contaminants that could accumulate over time and become hazardous waste or result in groundwater contamination. This Minimum Scraping Method is used by some urban flood control agencies who operate basins with fixed infrastructure improvements (explained below), need to minimize contaminant accumulation and want to minimize the excavation of the basin bottom. Basins sometimes have infrastructure, such as dewatering pumps and inlet structures, which are typically placed at the lowest elevation of the basin bottom to facilitate the removal of water from the basin. These structures become less effective as repeated scraping and removal of basin material results in the basin bottom being placed below the fixed structures. The routine removal of excess material from the basin deepens it beyond a desired depth. As a result of these significant concerns, the basin bottom is not ripped or decompacted then disked or somewhat flattened after the sediment is removed. To do so, would result in the creation of an uneven bottom surface requiring subsequent removal of the excess material during the following cleaning. Consequently, the basin bottom becomes increasingly compacted and less permeable over time.

To maintain the basin, the basin bottom is dried sufficiently to allow equipment, such as a motor grader, to drive on the bottom and windrow the thin layer of sediment into ridges. The windrowed sediments are welted (to limit air dispersal) then scraped up by a loader into a dump truck, or similar equipment, for removal. This process leaves the basin bottom relatively smooth and flat and is repeated as needed. Depending on the soil composition and the amount of compaction from the equipment, the basin bottom usually becomes compacted quickly, resulting in ever decreasing percolation rates between cleanings. The basin is then ready for filling and normal operation. The Minimum Scraping method serves it's prime objective of removing the sediment and most contaminants. However, the resulting compaction significantly degrades the percolation ability of the basin. This usually results in the basin having to be drained by pumping rather than by percolation. This method is limited by the availability and cost of operating pumping and heavy equipment. The effectiveness of this method is also limited by climate, water availability and loss of basin operation benefits due to the time needed for adequate draining/pumping/drying and equipment operation.

What is needed is an improved system for controlling sediment in fluid containment basins that is beneficial for both effective percolation rates and management of contaminants. Such an improved system should reduce the frequency of basin maintenance, the cost of that maintenance and the need to dispose of unwanted basin materials. In addition, an improved sediment control system should be cost effective for installation in new fluid containment basins and easily adaptable to existing water containment basins. Ideally, an improved sediment control system should minimize the amount of labor necessary for basin maintenance, the amount and frequency of basin downtime and the air dispersal of any basin contaminants.

SUMMARY OF THE INVENTION

The sediment control system for fluid containment basins of the present invention provides the benefits and solves the problems identified above. That is to say, the present invention discloses a sediment control system that reduces the clogging effect of sediments found in basin influent and, thereby, reduces the need for basin maintenance. Use of the system of the present invention reduces the frequency and cost of basin maintenance, the amount of labor and materials needed for maintenance, the need to dispose of unwanted basin materials and the amount of time a basin must be taken out of operation for maintenance. The system of the present invention also reduces the likelihood that contaminants will be dispersed in the air. The sediment control system is easy and cost effective for both new fluid containment basins and retrofitting of existing fluid containment basins. In addition, the system of the present invention can be used for fluid containment systems that are configured to contain and percolate fluids other than water and which percolate that fluid through mediums other than just soils.

In one embodiment of the present invention, the sediment control system for fluid containment basins comprises a fluid containment basin that is configured to receive and store a volume of fluid, such as water, therein. The typical basin is formed by a plurality of basin embankments enclosing a basin bottom. One or more ridges are placed on the basin bottom in the basin. Each of the ridges generally have at least two sides and an upper area at and near the top of the ridge. The sides formed at a sloped angle sufficient to facilitate the operation of the present invention. Next to the ridges are located furrows that are formed substantially parallel to the ridges. In the preferred embodiment, the basin contains a plurality of ridges and a plurality of furrows. The ridges form at least one pair of spaced apart ridges with a furrow disposed between and bounded by the pair of ridges. Preferably, the plurality of ridges are generally parallel to each other and to at least one of the basin's embankments. The ridges should be shaped and configured, such as an inverted "V" shape, to facilitate the settlement of sediment contained in the fluid into the one or more furrows. The ridges can be formed from material that is taken from the bottom of the basin used to form the furrows or it can be brought into the basin from an outside source. When properly constructed, at least a portion of the upper area and the sides of the ridges are washed relatively clean of sediment (which settled out of the fluid when it was at a level above the ridges) by the wave action against the ridges. Although the use of wind to generate the waves is preferred, the basin can comprise a mechanism for generating the waves.

The present invention also includes a method of establishing a fluid containment basin that is configured to receive and store a volume of fluid in the basin. As above, the standard basin has a plurality of basin embankments enclosing a basin bottom. The method adds the steps of forming ridges on the bottom of the basin where each of the ridges has at least two sides and an upper area. Also formed in the basin bottom are furrows. The furrows should be formed adjacent to the ridges. The basin should then be filled with fluid such that W the level of the fluid in the basin is above the ridges. Again, the ridges should be shaped and configured to facilitate the settlement of sediment contained in the fluid into the furrows positioned in between the ridges. The furrows can be made into or comprise an impermeable layer to prevent contaminants that may be in the fluid from leaching out of the basin through the furrows.

The present invention also includes a method for enhancing the permeability of and/or providing for the collection of sediment in a fluid containment basin having the steps of forming the furrows, forming the ridges adjacent to the furrows and filling the basin with fluid to submerge the ridges. To maintain permeability the flow of fluid into the basin should be reduced on a periodic basis so that wave action can wash sediment off of the upper area and sides of the ridges as the water level is lowered. After washing of the ridges, the basin can be re-filled with fluid. In an alternative embodiment, a substantially impermeable mat of sediment can be allowed to form in the furrows to prevent migration of one or more contaminants contained in the fluid out of the basin. With the contaminants contained in the furrows, they can be treated or, if sufficient time is available, allowed to deteriorate into harmless or less harmful components.

Accordingly, the primary objective of the present invention is to provide a sediment control system for water containment basins having the features generally described above and more specifically described below in the detailed description.

It is also an important objective of the present invention to provide a sediment control system for water containment basins that results in easily maintained, permeable sloped surfaces (ridges) through which water percolates without the clogging restrictions at the bottom of the basin between ridges.

It is also an important objective of the present invention to provide a sediment control system for water containment basins that minimizes the potential for groundwater contamination from sediment which may be bonded with contaminants by collecting such sediments in the portion of the basin where the least amount of percolation takes place.

It is also an important objective of the present invention to provide a sediment control system for water containment basins that has relatively easily maintainable areas in the bottom of the basin furrows.

It is also an important objective of the present invention to provide a sediment control system for water containment basins that primarily uses naturally occurring forces, such as wind and gravity, to provide basin maintenance, thereby minimizing the use of fossil fuels and reducing pollution.

It is also an important objective of the present invention to provide a sediment control system for water containment basins that is cost effective to install and maintain for both new basin installations and the retrofitting of existing basins.

The above and other objectives of the present invention will be explained in greater detail by reference to the attached figures and the description of the preferred embodiment which follows. As set forth herein, the present invention resides in the novel features of form, construction, mode of operation and combination of parts presently described and understood by the claims.

BRIEF DESCRIPTION OF THE DRAWINGS

In the drawings, where closely related drawings have the same number but different alphabetic suffixes, which illustrate the prior art and the best modes presently contemplated for carrying out the present invention.

| REFERENCE NUMERALS IN DRAWINGS | |
|---|---|
| 10 | Basin (prior art) |
| 12 | Basin bottom |
| 14 | Basin embankment |
| 16 | Operational water level |
| 18 | Flow through basin bottom |
| 20 | Flow through embankment |
| 22 | Settled sediment (mat) |
| 24 | Water |
| 26 | Native/uncompacted material |
| 28 | Compacted material |
| 30 | Basin (prior art) |
| 32 | Shallow mixed zone |
| 34 | Basin (prior art) |
| 36 | Deep mixed zone |
| 40 | Basin (current invention) |
| 42 | Ridges |
| 44 | Furrows |
| 46 | Excavated material |
| 48 | Bottom of furrow |
| 50 | Upper area of ridges |
| 52 | Sides of ridges |
| 54 | Ridge slope angle |
| 56 | Uncompacted area under ridge |
| 58 | Water flow through furrow bottom |
| 60 | Lightly compacted area under furrow |
| 62 | Gravity and underwater currents |
| 64 | Waves |
| 66 | First water level |
| 68 | Second water level |
| 70 | Third water level |
| 72 | Point of wave contact on ridges |
| 74 | Fan |

DETAILED DESCRIPTION OF THE PREFERRED EMBODIMENTS

Figure 1A:
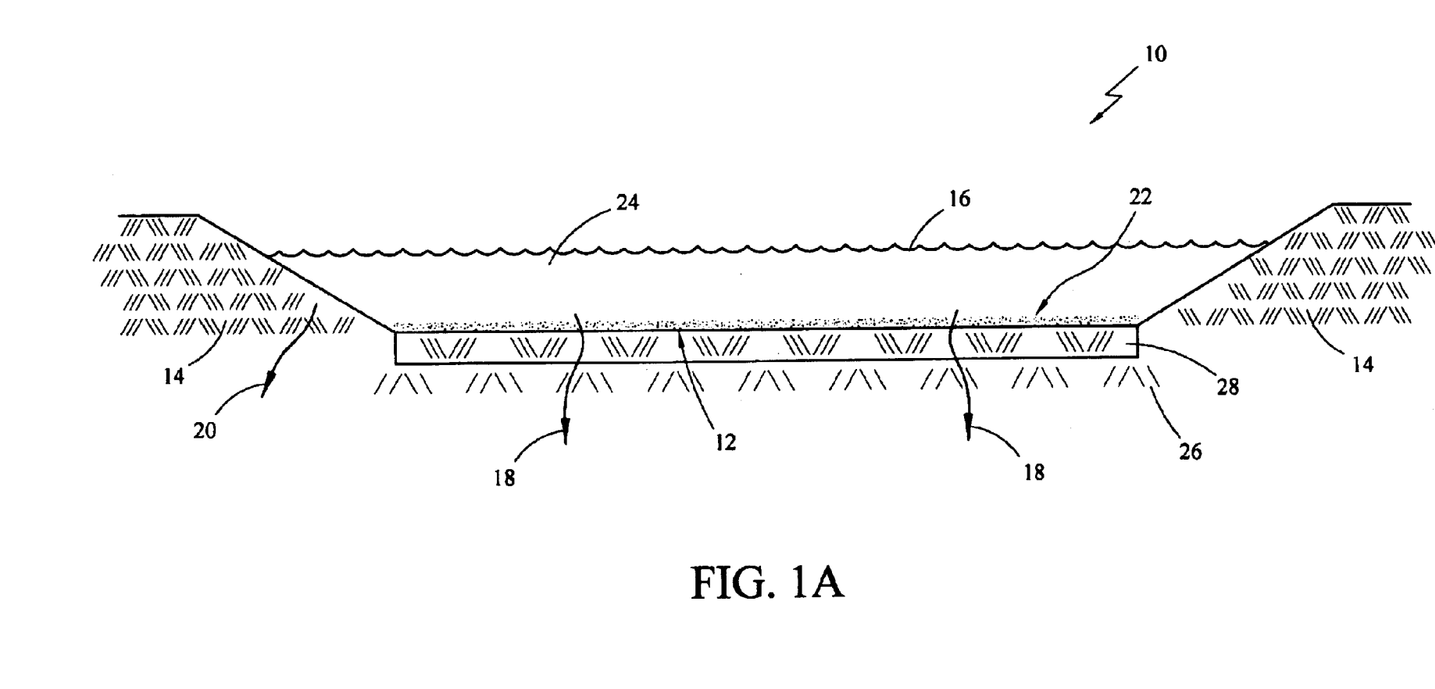
FIG. 1 is a side view of a typical prior art operating basin with sediment accumulating on the bottom.
Figure 1B:
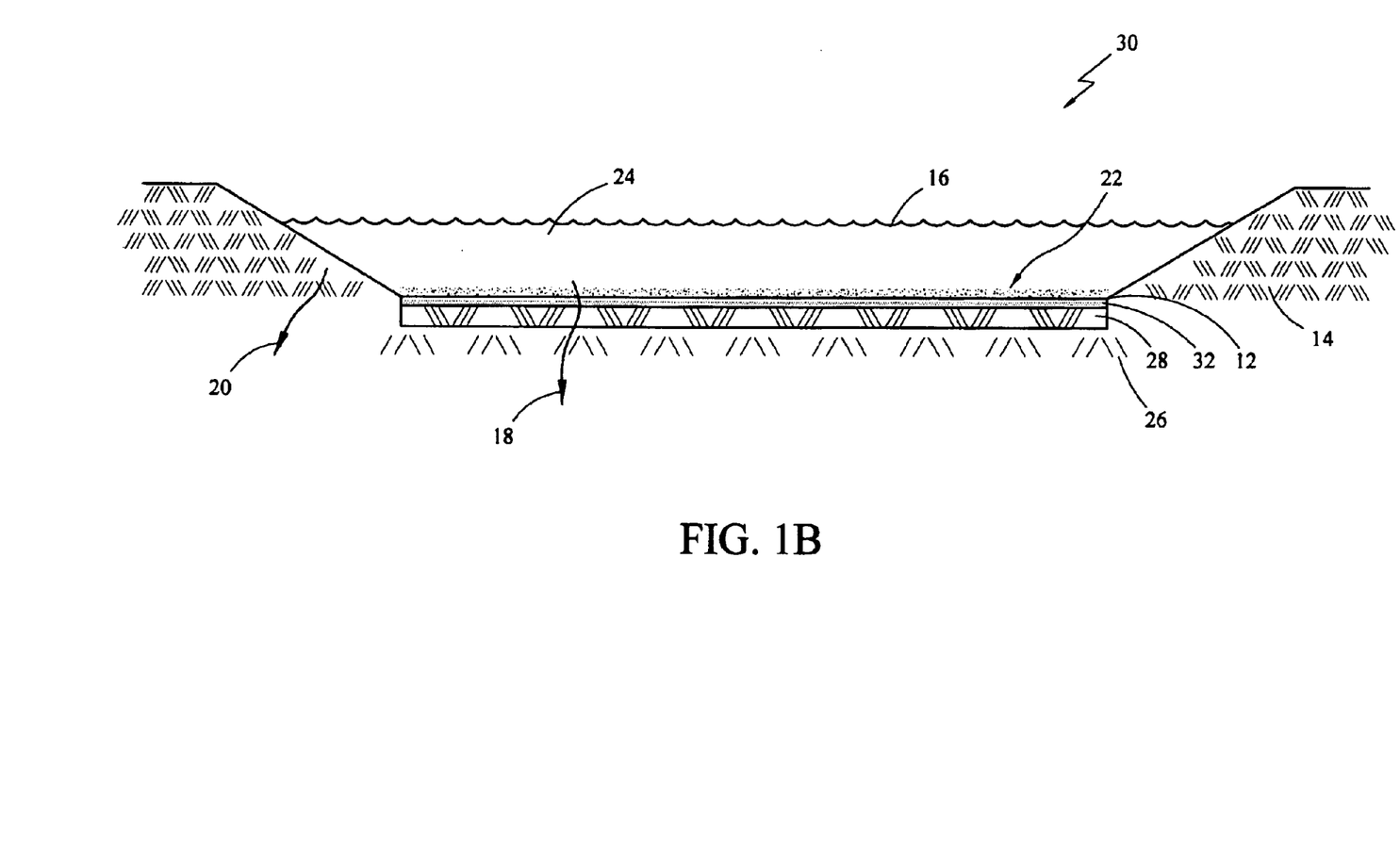
FIG. 1B is a side view a typical prior art operating basin which has been maintained using shallow surface mixing to control the clogging effects of sediment.
Figure 1C:
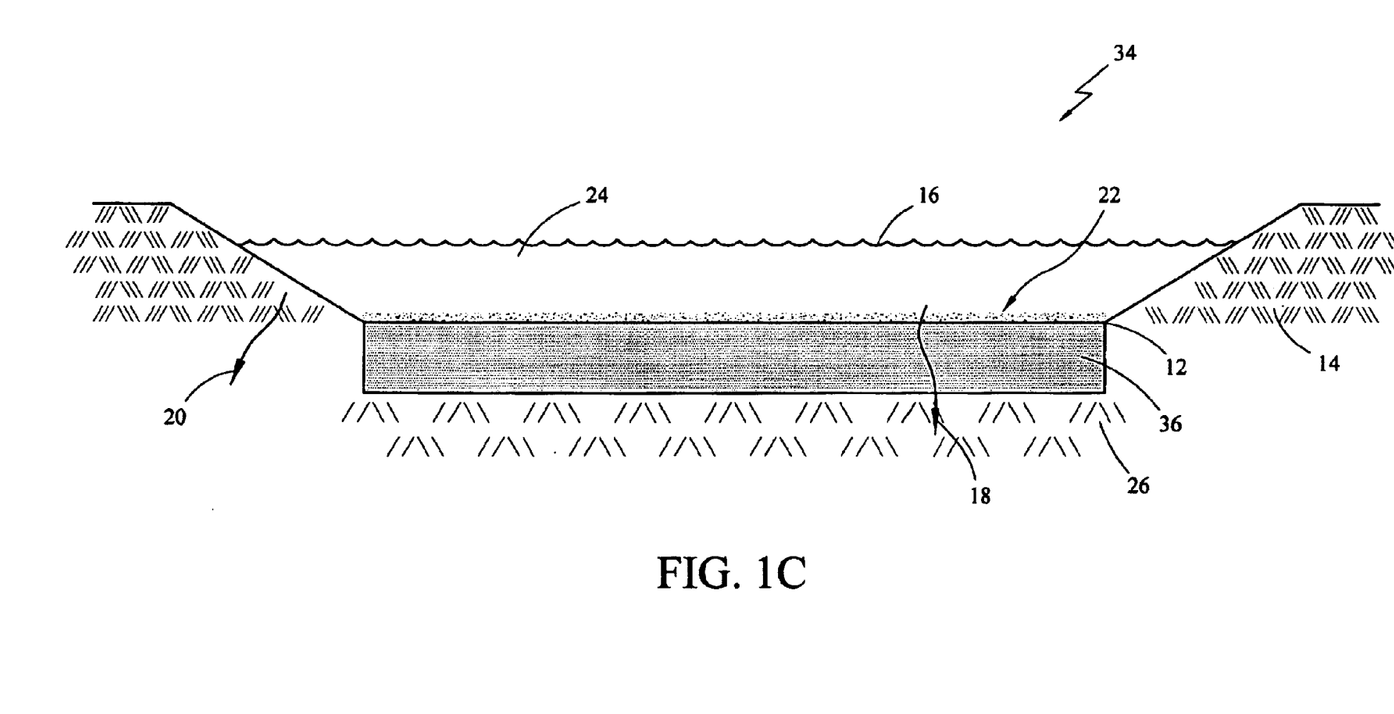
FIG. 1C is a side view of a typical prior art operating basin which has been maintained using deep surface mixing to control the clogging effects of sediment.

With reference to the figures where like elements have been given like numerical designations to facilitate the reader's understanding of the present invention, and particularly with reference to the embodiment of the present invention illustrated in FIGS. 2A through 2C, the preferred embodiments of the present invention is set forth below. The prior art of maintaining operational water containment basins is shown in FIGS. 1A through 1C. With regard to FIG. 1A, this figure shows the condition of a basin operated using the "Dry and Crack" or "Chip" Method of maintenance and the initial basin condition before the use of the other methods as discussed in the Background Art section herein. FIG. 1A shows a prior art basin 10 having the typical flat bottom 12 and sloped basin embankments 14 with an operational water level 16. The bottom percolation 18 occurs through the bottom 12 and embankment percolation 20 occurs through the basin embankments 14 of basin 10. The settled sediment (or mat) 22 is somewhat uniformly distributed on the bottom 12 of basin 10. The basin 10 normally operates so that most of the percolation occurs through the basin bottom 12 rather than through the embankments 14. This is particularly true when the basin 10 is not clogged or when the water level 16 is shallow and less of the embankments 14 are in contact with the water 24. The basin bottom 12 becomes clogged by the mat 22 over time, requiring basin 10 to be drained and basin maintenance performed. Eventually, mat 22 will be removed by heavy equipment. In so doing, the upper portion of the drainage medium 26 of basin 10 is compressed forming a compacted area 28 that becomes increasingly less permeable with repeated maintenance. The compacted area 28 decreases the rate of percolation 18 through the bottom 12 of basin 10. The drainage medium 26 under the compacted area 28 remains generally uncompacted and permeable.

FIG. 1B shows the condition of a basin 30 operated using the Shallow Mixing Method. The mat 22 of settled settlement material has been mixed with the near surface materials to form a shallow mixed zone 32 and a new mat 22 has formed on the bottom 12 of basin 30. The shallow mixed zone 32 will accumulate increasing concentrations of inorganic and/or organic settled sediment material into mat 22 through repeated maintenance mixing. The increased concentrations of inorganic sediment in the shallow mixed zone 32 will eventually result in an inorganic clogged condition and significantly decrease the bottom permeability 18. The repeated addition and mixing of organic sediment will eventually support and promote anaerobic activity and result in significant organic clogging. The anaerobic microbes are found in environments which lack air and normally have slime like membranes surrounding their cell structures to protect them from oxygen. These membranes effect a significant clogging layer when the anaerobic microbes become sufficiently populated in the mixed zone 32. When viewed at basin 30, organic clogging is, noted by dark discoloration of the shallow mixed zone 32. A septic or musky odor is sometimes associated with the organic clogging in the shallow mixed zone 32. Shallow mixing operations are at depths less than the compaction depths caused by the use of light and heavy equipment. Therefore, as in the "Dry and Crack" method shown FIG. 1A, a layer of compacted material 28 develops that restricts bottom percolation 18.

FIG. 1C shows the condition of a basin 34 operated using the Deep Mixing Method. The deep mixing zone 36 of the settled sediment (mat) 22 with mixed organic sediment supports anaerobic growth and results in eventual organic clogging, as with the Shallow Mixing Method shown in FIG. 1B. As discussed in the background art section, the mixed inorganic sediment will eventually and increasingly limit percolation 18 through the bottom 12 of basin 34. Compaction layers (shown as 28 in FIGS. 1A and 1B) do not develop since the mixing is adequately deep.

The basin 10 of FIG. 1A also shows the condition of a basin operated using the Minimal Scraping Method. The mat 22 collects on the bottom 12 until the basin 10 is drained, the mat 22 is dried to chips and removed by minimal scraping, as described above. The area just under the sediment becomes increasingly compacted forming the characteristic layer of compacted material 28. The layer of compacted material 28 becomes increasingly dense and will significantly reduce the bottom percolation 18. Since the Minimal Scraping Method does not loosen or rip the layer of compacted material 28, the basin 10 becomes increasingly impermeable over time. This decrease in bottom permeability 18 normally increases the cost of maintenance and makes the basin less efficient.

Figure 2A:
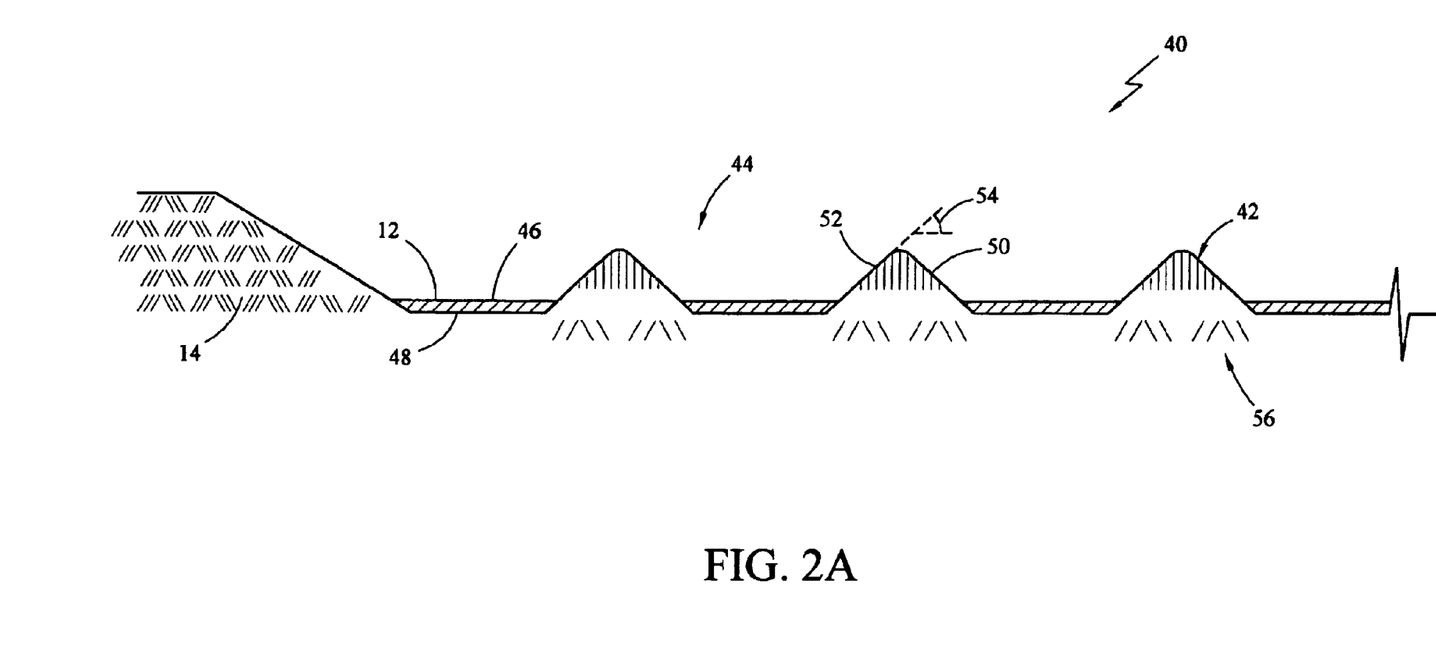
FIG. 2A is a side view of a typical basin bottom and banks and the areas from where material is excavated which forms the bottoms of the furrows and the areas where material is placed to form the ridges for use in the sediment control system of the present invention.
Figure 2B:
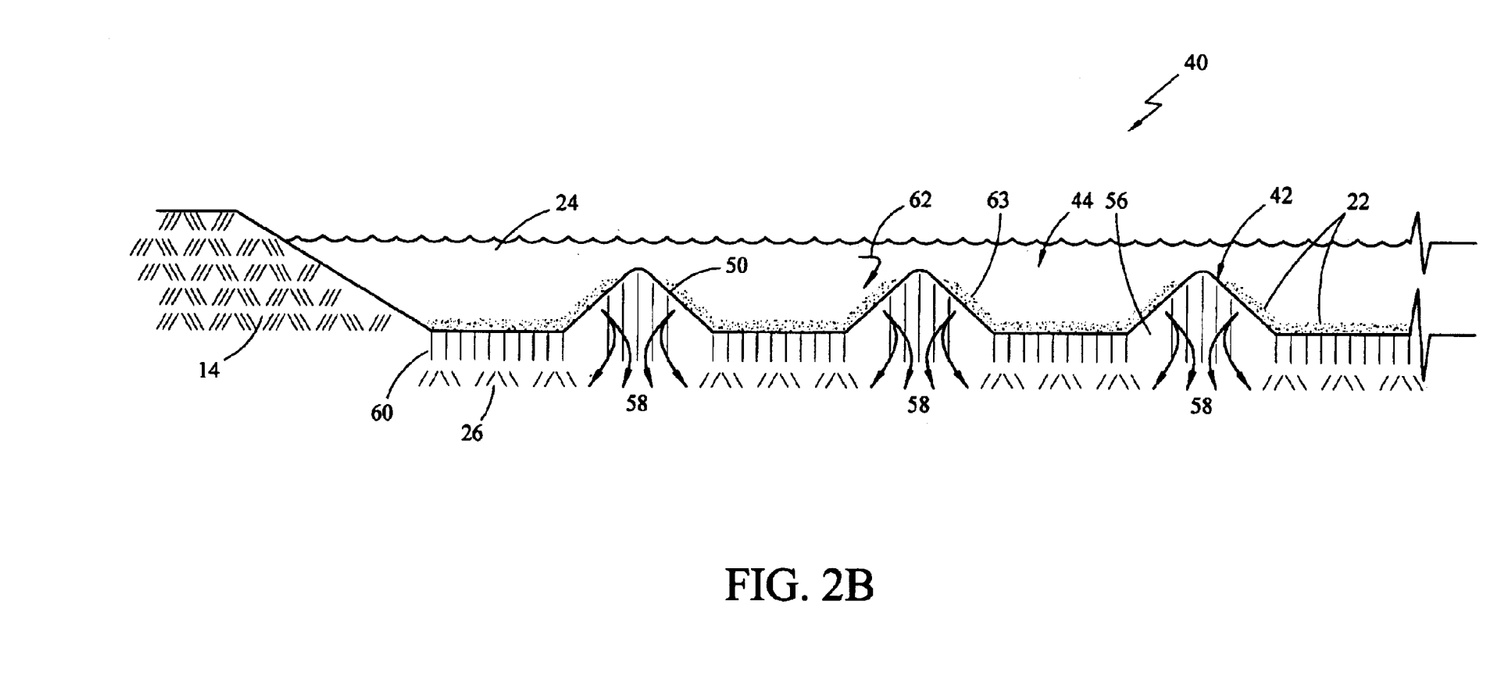
FIG. 2B is a side view illustrating the operation of a basin utilizing the sediment control system of the present invention showing the water level, ridges and furrows and showing the sediment accumulating in the furrows and not or only slightly on the ridges.
Figure 2C:
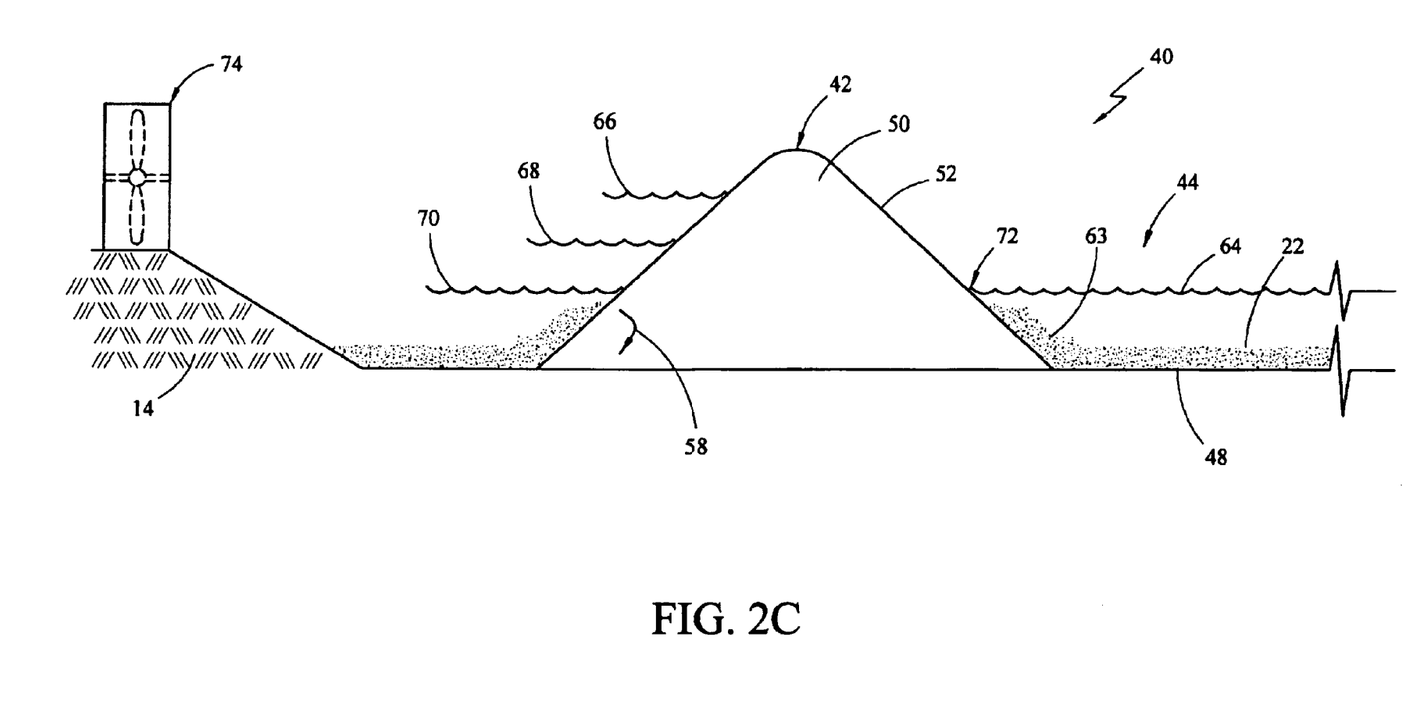
FIG. 2C is a side view of a basin utilizing the sediment control system of the present invention showing the effect of dewatering the basin where the sediment is placed into suspension at the descending water line.

A basin 40 employing a preferred embodiment of the present invention is illustrated in FIGS. 2A, 2B and 2C. As illustrated in the figures, basin 40 comprises at least one ridge 42 and an at least one furrow 44. In the preferred embodiment, as further described, a plurality of ridges 42 and furrows 44 are utilized. Ridges 42 and furrows 44 are constructed by moving excavated material, shown as 46 in FIG. 2A, from between the original basin bottom 12 to establish the bottom 48 of furrow 44 and placing the excavated material 46 in the shape of ridges 42 having a cross-sectional area generally in the shape of an inverted "V". For best effect, although not required, ridges 42 will typically extend almost the full length of the basin bottom 12 be generally parallel to one of its sides (shown as embankment 14). The upper area 50 of ridges 42 can be pointed, rounded or somewhat flattened. As set forth in more detail below, the direction of ridges 42 and furrows 44 will typically be selected to take advantage of natural conditions to fully exploit the present invention.

The side slope 52 of ridge 42 is an important component of the present invention and to the effectiveness of this system. The ridge side slope angle 54 is not specified, however any angle greater than five degrees will be generally effective. Better results are achieved by greater angles 54 up to the submerged angle of repose of the given material. The submerged angle of repose is the greatest angle above horizontal which the material will sustain when saturated or under water. For instance, silty sand will normally sustain a slope angle 54 of between twenty and forty degrees. The depth of furrows 44 is generally selected based on the amount of material necessary to remove from the bottom 12 of basin 40 to form ridges 42. If desired, however, ridges 42 and furrows 44 may be formed by bringing in outside (i.e., non-basin) material to form ridges 42, thereby avoiding the need to perform any excavation of the bottom 12 of basin 40.

As set forth above, ridges 42 are preferably constructed from excavated material that placed by equipment (such as a motor grader with it's blade swung to one side of the grader's tires) that is operated in the area of furrows 44 which does not drive over the area 56 under ridges 42, thereby preventing unnecessary compaction of area 56. In addition, the equipment should not drive on ridges 42, again to avoid compaction, during the construction of ridges 42. In this manner, compaction of ridges 42 and the area 56 under ridges 42 is minimized, thereby maximizing the permeability of ridges 42. The illustrated water flow 58 through ridges 42 illustrates that the significant portion of the basin's permeability will be through the sides 52 of ridges 42.

Furrows 44 should be constructed by using light weight equipment, such as the motor grader with it's blade swung under the grader, so that the area 60 underlying furrow 44 is only lightly, or as lightly as possible, compacted. This lightly compacted material 60 will allow water to percolate through the bottom 48 of furrow 44 until the accumulated settled sediment (mat) 22 clogs the furrow 44. The furrow 44 could be intentionally compacted or lined to limit initial bottom percolation 18 through furrows 44, before the basin's initial filling, if in-place pollutant/contaminant control or treatment is a concern.

In normal use operations, as best shown in FIG. 2B, basin 40 is operated by filling the basin 40 with fluid (i.e., water) to completely submerge the ridges 42 below water level 24. An adequate submersion is important to prevent weed and other vegetative growth on ridges 42 and to prevent unwanted erosion of ridges 42. The settled sediment (mat) 22 which initially settles on the ridges 42 tends to migrate downward toward and into the furrow 44. When the ridges 42 are submerged, the mat 22 migration is advantageously effected by gravity and underwater currents, shown as 62 on FIG. 2b. As discussed above, greater slope angles 54 generally results in improved mat 22 migration. As a general rule, the slope angles 54 should exceed 4% as sediments will tend to migrate off greater than 2% slopes.

During operation, the surface and very near surface of the ridges 42 and furrows 44 becomes increasingly composed of the coarser and sandier grains of the native material. The finer grains of the native materials, such as silts and clays, move downward into the ridges 42 and furrows 24. This process is known in geological terms as 'soil maturation' and is useful in the present invention. This phenomenon is commonly recognized by the very sandy material found under chips. It also accounts for the density of the layer of compacted material 28 in the prior art basin 10. Soil maturation occurs when water moves through a body of soil, such as in this case by percolation. During soil maturation the finer grained materials, such as silt and clay, moves with the water flow leaving the sandier grains behind. The water flow 58 through the ridges 42 moves some of the naturally occurring silts and clays into the ridge 42 and beneath the surface of the ridge 42. As explained below, the present invention takes advantage of this phenomenon to provide an increasingly permeable surface on ridges 42 and minimizing equipment use in furrows 44 and the compaction that results from such equipment use.

The operation of the basin with relatively steep ridges 42 and with normal sediment concentration in the inflow water, is typically straight forward. The sides 52 of ridges 42 should have a sufficiently steep slope angle 54 to significantly promote the migration of the sediment toward furrow 44 when ridges 42 are submerged, such as when water level 24 is at it's normal operating level. Depending on the ridge slope angle 54 and the concentration and type of sediment, some of the sediment may collect on the upper area 50 and sides 52 of ridges 42. Over time, the accumulation of sediment on these areas may rise to levels where it decreases the overall basin permeability. One of the primary benefits of the basin 40 configured to the present invention is the ability to deal with this naturally occurring phenomena without the need for expensive, difficult and time consuming maintenance, which in the prior art generally requires that the basin be drained and dried.

The basin 40 of the present invention allows a virtually no or low cost maintenance tool that is effective for removing most of the accumulated sediment, shown as 63 in FIG. 2C, on ridges 42 so as to significantly improve the permeability of basin 40. The preferred maintenance of basin 40, which results from use of the present invention, utilizes another naturally occurring phenomena, that being wind-driven waves 64, as best shown in FIG. 2C. Operating the basin 40 to take advantage of this "maintenance" merely requires reducing or shutting off the fluid inflow to basin 40 for a several days or a few weeks during a windy period. Generally, shallow basins may be able to be "maintained" in a period of several days, whereas deep basins will generally require a few weeks. Because the inflow is reduced or shut-off, the operating water level 24 will lower as the basin percolates. The upper areas 50 of ridges 42 become increasingly exposed above the declining water level, as shown in FIG. 2C. The movement and force of the wind driven waves 64 displace most, if not all, of the sediment that was on the upper areas 50 of the ridge 42 and the sides 52 of ridge 52 into suspension. As the water level decreases, such as illustrated by water levels shown as first water level 66, second water level 68 and third water level 70 in FIG. 3, more of the sides 52 of ridges 42 are exposed, causing waves 64 to remove the sediment from a lower point along the sides 52 of ridges 42 at the location 72 where waves 64 contact ridge 42. The removed sediment 63 becomes suspended in the water and then settles on the portion of sides 52 of ridges 42 that are underwater (i.e., below water levels 66, 68 or 70) and then subsequently to the bottom 48 of furrow 44, forming mat 22 in furrow 44. As the water level continues to decrease, the suspension of the sediment 63 and resetting toward the furrows 44 continues until the ridges 42 are completely exposed and most, if not all, of the sediment 63 has been settled onto the area of furrows 44.

Instead of merely relying on the natural wind to create waves 64, the waves 64 can be generated by other means (although if wind is available and adequate, it is clearly the preferred force to create waves 64). Using wind driven waves 64, which can be referred to as wind washing, is a simple and prescribed method of periodically maintaining the flow-through effectiveness of the ridges 42. Man-made mechanical or other devices can be utilized to create the waves. For instance, large fans or other wind-generating devices, such as fan 74 shown in FIG. 2C, can be set-up to blow air across the basin and create the waves necessary to clean off the sides of the ridges. Alternatively, various mechanical wave generating devices, such as one or more moveable paddles located at one end or side of the basin, can be used to generate the waves (even jet skis could be used). Many of these devices are commonly known and are in use, albeit for different purposes, for waste water treatment and amusement parks. The surface of the sides 52 of ridges 42 become increasingly coarser or sandy by the washing of waves 64 and, therefore, more permeable with each successive wave washing cycle. The surface and near surface of the upper area 50 and sides 52 of ridges 42 also become more permeable by the process referred to above as soil maturation. The resultant effect on the ridges 42 is that the surface of the ridge 42 becomes increasingly course grained and more permeable with use.

WORKING EXAMPLE

For purposes of illustrating the sediment control system for water containment basins of the present invention and the method of establishing and maintaining the same, an example use is set forth. The following example is just one example representative of the many types of configurations and uses to which the sediment control system is suitable. The example is for illustrative purposes only and is not intended to restrict the invention to a particular use or to the particular materials used in the example.

The inventor has utilized the sediment control system of the present invention in a generally square fifteen acre basin 40 having a twelve acre bottom area. Ridges 42 have been constructed and spaced on twenty-five foot centers (i.e., measured from the center of one ridge 42 to the center of another ridge 42) with furrows 44 therebetween. Each ridge 42 was constructed approximately four feet tall and ten feet wide at its base. During the first saturation the ridge 42 settled to a height of three feet. The soil in the said basin 40 is stable and the ridges 42 do not settle significantly further and the slopes of sides 52 maintain their shape and do not significantly erode downward toward the furrow 44. A typical unclogged basin 40 percolation rate might average 0.3 feet (0.1 meter) per day during wave washing. The basin 40 might have ridges 42 with average heights of two feet (0.6 meter), therefore the wave washing maintenance method would normally require about a week after the declining water level reaches the top of the basin's ridges 42. Once the water level reaches the base of most ridges 42, or as desired, the basin 40 can be refilled with the basin 40 operating at or near maximum percolation.

The height of the ridges 42 is usually governed by the type of soil and equipment available to construct the ridges 42, the depth of the basin 40 and the desired width of the ridge base. As mentioned before, a steeper ridge side slope 54 is more effective at migrating the sediments while submerged and during any dewatering or wave washing events. The slope angle 54 is limited by the angle of repose of the saturated ridge material. The spacing between the ridges 42 is governed by the width between the ridge bases (furrow 44 area) and the width of the ridges' bases. The furrow 44 should be wide enough to easily accommodate the desired equipment (i.e. a motor grader) to build the ridges 42 and the equipment (i.e. a paddle wheel scraper) to remove the sediment mat 22 in furrows 44 when desired. Ridges 42 built with relatively narrow furrows 44, however, have the advantage of providing the basin bottom with more ridge surface area than if built on relatively wide furrows 44. The additional surface area allows the basin 40 to operate for a longer time period before dewatering and wave washing is required for maintenance. The disadvantage with using narrow furrow areas 44 is that future furrow scraping operations may be hampered by constrictive width conditions.

The orientation of the ridges 42 to the prevailing winds can be an important consideration. It has been found that wave washing is best accomplished with the ridges 42 running perpendicular to the prevailing wind unless strong winds are predictable. When strong winds are predictable, the ridges 42 can be oriented parallel to the prevailing winds with good results.

By constructing reasonably steep ridge side slopes and using regular wave washings, a basin's permeability is maintained without the significant and burdensome disadvantages of the prior art's various methods. Obviously, unclogged basin percolation rates vary depending on surface and subsurface geological and hydro geological conditions.

The wave washing is the preferred and least cost method of ensuring the basin's permeability. This method can be done almost any time of year, requires little time, little staff resources, no light or heavy equipment (and resulting pollutants), and subsequently produces no additional basin compaction. The wave washing does not rely on dry or hot weather to dry the basin bottom so equipment can access the maintenance area. The dewatering can easily occur during cold damp periods since the average rainfall in most areas produces less water than a typical unclogged percolation rate.

The wave washing is done in the time it takes to dewater basin 40 during a windy period. The basin 40 does not need to be dried as with all methods of the prior art. The ridges 42 will remain relatively sediment free between wave washing cycles, enabling the water in basin 40 to be lowered by natural percolation rather than pumping. Natural percolation is normally faster and obviously less expensive than pumping. Percolation relies on unclogged and uncompacted material. Without the use of light or heavy equipment, compaction is minimized and percolation rates are maintained at or near maximum levels. In addition, staff time is minimized as no heavy equipment is involved and the total time is much less than with the fastest prior art, the Dry and Crack Method. No light or heavy equipment is needed nor desired to wave wash the sides 52 of ridges 42. This is a significant advantage because heavy equipment operation normally requires rental or acquisition, mobilization, coordination, supervision, maintenance and operation. Each of these elements is resource and time consumptive. The benefit of eliminating fuel consumption and air pollution, from the equipment and/or the basin itself, is and will become increasingly more significant. In high sediment loading conditions and/or where the ridges 42 are at relatively low angles and low laying, the sediment will be frequently wave washed and periodically removed to keep the sediment accumulation from significantly encroaching on the ridge sides 52. Keeping the sides 52 of ridges 42 available for percolation is key to maintaining relatively high percolation rates for a given basin.

An Additional Benefit of the Present Invention is in the field of contaminant control and treatment systems. In this field, sediment is removed when collected contaminants concentrations rise to levels of concern. The level of concern will likely be governed by the level of waste handling chosen rather than by groundwater contaminant concerns for the above mentioned reasons. The furrows 44, adjacent to ridges 42, should be constructed reasonably flat so that the furrows 44 will somewhat uniformly collect the sediment 63 which settles in basin 40 and which migrates off the ridges 42. Over time, the furrows 44 become increasingly less permeable and soon becomes clogged. If the combined area of the furrows 44 is approximately one-half (for example) of the basin bottom area, the time required to clog the furrows 44 should be about one-half of the time required of a typical flat bottomed basin (i.e, basin 10). The permeability of the furrows 44 significantly decreases with time, therefore the contaminants loosely bonded to the sediment and/or settled within the furrows 44 tend to remain within the sediment and mat 22 in furrow 44 rather than migrating into the material under the sediment and then toward the groundwater.

Many contaminants in the mat 22 in furrows 44 will undergo degradation and decomposition due to biological, biochemical and chemical reactions. In most cases, this degradation will result in the transformation of contaminants of concern into compounds and molecules which are not harmful or not as harmful to the environment. Whether inert or degraded, the contaminants will tend to remain in the significantly impermeable mat 22 rather than migrating through the mat 22 toward the groundwater. The collected sediment and contaminants can be allowed to accumulate in the furrows 44 for many years and even perhaps for the life of the project.

From the description above, a number of advantages of this sediment control system become evident:

(a) A basin 40 can be constructed or retrofitted with ridges 42 and furrows 44 to optimize the percolation rate. This is due to the system's use of gravity and water currents to direct the sediment 63 into a dedicated collection area while keeping the sloped sides 52 of ridges 42 relatively and significantly unclogged. This self cleaning action is accomplished with the basin in full operation. This is a significant advantage over the prior art.

(b) The ridges 42 can be wave washed, if necessary, to further remove accumulated sediment 63 and/or ensure the removal of accumulated sediment 63 from the ridges 42 and into the furrows 44. The infrequent sediment removal is a significant advantage over the prior art. This cleaning action is accomplished while the basin is drained during a windy period and without the need for extended drying periods, heavy or light equipment, combusting polluting fossil fuels, and expensive staff time. This is also a significant advantage over the prior art.

(c) The furrows 44 collect accumulated sediment 63 and settleable contaminants which, if not removed frequently, will form mat 22 comprising a clogged and impermeable layer. This impermeable mat 22 has the advantage of preventing the contaminants from migrating into the underlying material and toward or into the groundwater. This advantage will become increasingly significant as regulatory concerns seek to protect the quality of the groundwater. As an example, the State of California now imposes strict limits on contractors at construction sites to control and monitor the surface water discharges from the construction sites. Concerns over sediment and contaminant discharges would be less severe if a nearby basin, using the present invention, were in operation and handling the discharges from many new construction (and existing development or agricultural) site's discharges. The economy of scale could save significant resources while providing a high level of consistent mitigation.

(d) Many of the contaminants contained in the mat 22 in furrows 44 will undergo degradation and decomposition over time, rendering them less harmful or harmless in the environment after removal from the furrow 44. This advantage offers an in situ or in place treatment of many contaminants, not previously available in percolation basins. The treatment of the concentrated contaminants might also be catalyzed in the furrow mat 22 by the intentional addition of chemicals and/or microbes.

Conclusion, Ramifications and Scope

Those skilled in the art will see that the ridges and furrows provide a highly efficient system of maintaining permeability while collecting the sediment in a controlled environment. The present invention is concerned with those ridges or mounds which are constructed within the basin bottom area and are designed to improve the permeability of the basin. The present invention is also concerned with the use of furrows or depressions adjacent to the ridged areas to collect the sediments migrating off the ridges and the sediments which would normally accumulate on a flat basin bottom. The normal maintenance of this system is as simple as dewatering or draining the basin during a windy period to allow the few accumulated sediments to be wave washed from the ridge side slopes and into the furrows.

A number of variations are possible. For example, the ridges can be of any length short of the length or width of the basin bottom. The ridges could take the shape of a single or multiple mounds within a basin (i.e. submerged islands). Although the ridges are normally placed in somewhat straight rows and parallel to each other, there could be as few as one ridge or furrow per basin and/or could be constructed with curved shapes or as arcs. Another variation is that the furrows could be compacted and/or made significantly impermeable with the placement of materials such as clays, bentonite or sheets of plastic. This might be done in order to take advantage of the specified embodiment wherein contaminants are contained in the furrow mat for natural or catalyzed treatment or for later removal. Yet another variation is the use of this sediment control system in a liquid medium other than water, such as in a chemical formulating plant where sediment is separated from a liquid other than water by the present invention. Still another variation is the use of other than native soil as the material from which the ridges and furrows are constructed. In addition, the basin of the present invention could be used to contain fluids other than water. If the sediment on the ridges becomes so tightly bonded to the ridges that wave washing is not effective, the ridge could be dried and the chips either blown away (i.e., by backpack blower) or raked into the furrows with relative ease.

While the above description contains many specifics, these should not be construed as limitations on the scope of the invention, but rather as an exemplification of one preferred embodiment thereof. Accordingly, the scope of the invention should be determined not by the embodiments illustrated, but by the appended claims and their legal equivalents.

What is claimed is:

1. A fluid containment basin configured to receive and store a fluid therein, said basin comprising:

a plurality of basin embankments enclosing a basin bottom;

one or more ridges on said basin bottom in said basin, each of said one or more ridges having at least two sides and an upper area thereon, said sides formed at a sloped angle, wherein at least a portion of said sides and said upper area of said one or more ridges are generally washed clean of sediment by one or more waves of said fluid in said basin;

one or more furrows adjacent to at least one of said one or more ridges, said one or more furrows formed substantially parallel to said one or more ridges; and means for generating said one or more waves.

2. The fluid containment basin of claim 1 further comprising a plurality of ridges forming at least one pair of spaced apart ridges and a plurality of furrows, wherein at least one of said plurality of furrows is disposed between and bounded by said at least one pair of ridges.

3. The fluid containment basin of claim 2, wherein each of said plurality of ridges are generally parallel to each other.

4. The fluid containment basin of claim 3, wherein said plurality of ridges are generally parallel to at least one of said embankments.

5. The fluid containment basin of claim 1, wherein said one or more ridges are shaped and configured to facilitate the settlement of sediment contained in said fluid into said one or more furrows.

6. The fluid containment basin of claim 5, wherein said one or more ridges are generally formed into an inverted "V" shape.

7. The fluid containment basin of claim 1, wherein said one or more ridges are formed from material taken from said bottom of said basin used to form said one or more furrows.

8. A method of establishing a fluid containment basin configured to receive and store a fluid in the basin, said basin having a plurality of basin embankments enclosing a basin bottom, said method comprising the steps of:

a. forming one or more ridges on said basin bottom, each of said one or more ridges having at least two sides and an upper area thereon, said one or more ridges being generally permeable to said fluid to allow said fluid to percolate through said one or more ridges, said one or more ridges configured in said basin to be washed by one or more waves of said fluid against said sides and said upper area to remove sediment from said one or more ridges to maintain, improve or restore permeability of said one or more ridges;

b. forming one or more furrows in said basin bottom, at least one of said one or more furrows adjacent to one of said one or more ridges; and c. filling said basin with said fluid so that the level of said fluid in said basin is above said one or more ridges.

9. The method of claim 8, wherein said ridge forming step comprises forming a plurality of ridges into at least one pair of spaced apart ridges and said furrow forming step comprises forming a plurality of furrows where at least one of said plurality of furrows is disposed between and bounded by said at least one pair of ridges.

10. The method of claim 8, wherein said one or more ridges are shaped and configured to facilitate the settlement of sediment contained in said fluid into said one or more furrows.

11. The method of claim 10, wherein said one or more ridges are generally formed into an inverted "V" shape.

12. The method of claim 8, wherein said one or more ridges are formed from material taken from said bottom of said basin used to form said one or more furrows.

13. The method of claim 8, wherein said furrow forming step includes forming a substantially impermeable layer in said one or more furrows.

14. A method for enhancing the permeability of and/or providing for the collection of sediment in a fluid containment basin configured to receive and store a fluid in the basin, said basin having a plurality of basin embankments enclosing a basin bottom, comprising the steps of:

a. forming one or more furrows in said basin bottom;

b. forming one or more substantially permeable ridges on said basin bottom, each of said one or more ridges having at least two sides and an upper area thereon, at least one of said one or more ridges formed adjacent to one of said one or more furrows, said one or more ridges shaped and configured to facilitate the settlement of sediment contained in said fluid into said one or more furrows;

c. filling said basin with said fluid to at least substantially submerge said one or more ridges;

d. reducing the flow of said fluid into said basin on a periodic basis to lower the level of the fluid in the basin from an operating level to a first fluid level in contact with said sides of said one or more ridges; and e. utilizing one or more waves of said fluid to wash sediment off of said sides and said upper area of ridges and into said one or more furrows.

15. The method of claim 14, wherein said one or more ridges are shaped and configured to facilitate the settlement of sediment contained in said fluid into said one or more furrows.

16. The method of claim 15, wherein said one or more ridges are generally formed into an inverted "V" shape.

17. The method of claim 14, wherein said furrow forming step includes forming a substantially impermeable layer in said one or more furrows.

18. The method of claim 14, wherein said one or more ridges are formed from material taken from said bottom of said basin used to form said one or more furrows.

19. The method of claim 14, wherein said basin further comprises means for generating waves to wash said ridges for said wave utilization step.

20. The method of claim 14, wherein said reducing step is controlled to facilitate washing at least a substantial portion of said upper area and said sides of said one or more ridges by reducing the level of said fluid in the basin a second fluid level or a third fluid level.

21. The method of claim 14 further comprising the step of:

f. re-filling said basin with said fluid.

22. The method of claim 14 further comprising the step of:

f. forming a substantially impermeable mat of sediment in said one or more furrows to prevent migration of one or more contaminants contained in said fluid from said basin by containing said one or more contaminants in said one or more furrows.

23. The method of claim 22 further comprising the step of:

g. treating said one or more contaminants contained in said one or more furrows.

24. A fluid containment basin configured to receive and store a fluid therein, said basin comprising:

a plurality of basin embankments enclosing a basin bottom;

one or more ridges on said basin bottom in said basin, each of said one or more ridges having at least two sides and an upper area thereon, said sides formed at a sloped angle, said one or more ridges being generally permeable to said fluid to allow said fluid to percolate through said one or more ridges, wherein said sides and said upper area of said one or more ridges are configured to be generally washed clean by one or more waves of said fluid in said basin so as to remove sediment from said one or more ridges in order to maintain, improve or restore permeability of said one or more ridges;

one or more furrows adjacent to at least one of said one or more ridges, said one or more furrows formed substantially parallel to said one or more ridges; and means for generating said one or more waves.

25. The fluid containment basin of claim 24 further comprising a plurality of ridges forming at least one pair of spaced apart ridges and a plurality of furrows, wherein at least one of said plurality of furrows is disposed between and bounded by said at least one pair of ridges.

* * * * *